Figure 1:
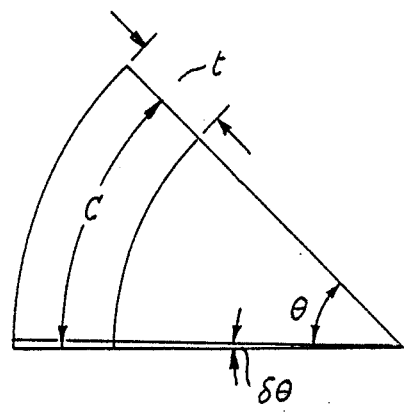

United States Patent [19]

Sloman et al.

[11] Patent Number: 4,836,876
[45] Date of Patent: Jun. 6, 1989

[54] METHOD FOR MOLDING FIBRE REINFORCED LAMINATES

[75] Inventors: Roger M. Sloman, Little Eaton; Christopher Ridgard, Oakwood, both of England

[73] Assignee: Advanced Composite Components Ltd., England

[21] Appl. No.: 90,590

[22] Filed: Aug. 28, 1987

[30] Foreign Application Priority Data

Sep. 3, 1986 [GB] United Kingdom ............. 8621236

[51] Int. Cl.⁴ .............................................. B32B 31/14
[52] U.S. Cl. ................................... 156/242; 156/245; 264/257; 264/258
[58] Field of Search ................... 156/161, 242, 245; 264/103, 128, 257, 258

[56] References Cited

U.S. PATENT DOCUMENTS 4,051,290 9/1977 Jutte et al. .................... 264/122
4,695,341 9/1987 Matuska et al. ............... 156/161

Primary Examiner—Caleb Weston
Attorney, Agent, or Firm—III Adams

[57] ABSTRACT

A method of molding a fibre reinforced resinous material comprising providing fibrous reinforcement in an initially uncured resin matrix, initiating a cycle which will result in the curing of the matrix and which includes an initial cure phase and a post cure phase, and selecting any one or more of the resin system, cure phases or initial cure temperature so that the sum of the fractional thickness change during the initial cure phase and the fractional thickness change during the post cure phase being equal to or differing by a predetermined amount from the fractional dimensional change in the plane of the fibre reinforcement at the desired end-use temperature at which greatest dimensional accuracy is required.

13 Claims, 1 Drawing Sheet

METHOD FOR MOLDING FIBRE REINFORCED LAMINATES

The present invention concerns an improved method of moulding fibre reinforced resinous material. Especially but not exclusively the method is applicable to materials consisting of an essentially two dimensional array of reinforcing fibres within a resin matrix. Such materials usually consist of a number of layers of fibre, in the form of woven cloth or unidirectional sheet, which are combined with a resin which is initially liquid or semiliquid. The resin is usually a thermosetting material, which is cured by the action of chemical hardeners, possibly requiring the application of heat.

It has been observed that in addition to the normal dimensional changes encountered on temperature change both the reinforcing fibres and the resin matrix may undergo significant dimensional changes during curing processes, especially those which involve changes of temperature and that a substantial proportion of these changes usually occur after the resin has become essentially solid. The result of these phenomena is that fibre reinforced resin mouldings normally undergo distortion as a direct result of the curing procedure. In order to produce mouldings of high dimensional accuracy, stability and structural performance it is customary to use reinforcing fibres which are both very stiff and relatively inert along the longitudinal axis with respect to the temperature changes encountered during curing procedures, such as carbon fibres. It is also customary to ensure that the orientation of the fibres is symmetric with respect to the mid-plane of the laminate. Failure to ensure this invariably results in further distortion. It has been shown, however, that whilst the dimensional changes in the plane of the laminate can be made small by an appropriate choice and distribution of reinforcing fibre, the dimensional changes through the thickness of the laminate remain controlled by the behaviour of the resin matrix and the transverse properties of the fibres.

The net result of the above is that laminates undergo fractional thickness changes during cure which are different from, and in general much greater than, the corresponding fractional in-plane dimensional changes. This behaviour causes initially curved laminates to undergo significant bending distortion or if restrained from movement, causes residual bending stresses, which remain within the laminate after the curing processes are complete.

The present invention depends on a recognition that a cure cycle usually comprises two phases, that is an initial cure phase and a post cure phase. During the initial cure phase pressure is applied to cause the resin to flow and consolidate the laminate followed by the gelation and solidification of the resin. Some heat may be required both to increase the resin flow and to initiate the curing reaction, and maintain it at a satisfactory rate. During the post cure phase the now solid partially cured material is subjected to further heat treatment, usually to increase the degree of cure and hence improve the resistance of the resin to elevated temperatures. The temperatures used during the post cure are usually higher than those during the initial cure. the cure cycle may also include one or more adhesive bonding operations, by which fibre reinforced resin and other materials are brought into contact and become solidly and mutually attached. Bonding operations may or may not be carried out simultaneously with the initial and post cure phases of the fibre reinforced resin materials.

In the present specification the term "a resin and reinforcement system" is intended to define any preselected arrangement of resin matrix composition, reinforcement composition, orientation and spacing, and proportion of resin to reinforcement.

According to the present invention there is provided a method of moulding a fibre reinforced resinous material comprising providing fibrous reinforcement in an initially uncured resin matrix, initiating a cycle which will result in the curing of the matrix and which includes an initial cure phase and a post cure phase and for a given resin and reinforcement system and cure phases selecting an initial cure temperature which results in the sum of the fractional thickness change during the initial cure phase and the fractional thickness change during the post cure phase being equal to or differing by a predetermined amount from the fractional dimensional change in the plane of the fibre reinforcement at the desired end-use temperature at which greatest dimensional accuracy is required.

Further according to the present invention a method of moulding a fibre reinforced resinous material comprising providing fibrous reinforcement in an initially uncured resin matrix, initiating a cycle which will result in the curing of the matrix and which includes an initial cure phase and a post cure phase, in which for a given initial cure temperature and cure phases a resin system is selected which results in the sum of the fractional thickness change during the initial cure phase and the fractional thickness change during the post cure phase being equal to or differing by a predetermined amount from the fractional dimensional change in the plane of the fibre reinforcement at the desired end-use temperature at which greatest dimensional accuracy is required.

Still further according to the present invention a method of moulding a fibre reinforced resinous material comprising providing fibrous reinforcement in an initially uncured resin matrix, initiating a cycle which will result in the curing of the matrix and which includes an initial cure phase and a post cure phase, in which for a given initial cure temperature and resin system pre and post cure phases are selected which result in the sum of the fractional thickness change during the initial cure phase and the fractional thickness change during the post cure phase being equal to or differing by a predetermined amount from the fractional dimensional change in the plane of the fibre reinforcement at the desired end-use temperature at which greatest dimensional accuracy is required.

Frequently, due to the preference for selecting materials such as carbon fibre where high structural performance is required, the method may include using fibre reinforcement of stiff, relatively inert fibres, in which the fractional change in dimension of the laminate in the plane of the reinforcement is very small and in this case the temperatures, resin, and reinforcement are chosen such that the fractional change in thickness during the initial curing phase is approximately equal to the fractional change in thickness during the post curing phase.

Preferably where a multi-layer, multi-orientation, unidirectional fibre reinforcement is employed a curing process is selected which will produce a fractional thickness change which equals the dimensional change in the plane of the reinforcement in one particular direction of fibre orientation, or which matches the mean value of the in-plane dimensional change.

Preferably the initial cure temperature is selected such that it is as low as possible while still producing a satisfactory initial cure phase. Ambient temperature is often a preferable initial cure temperature.

Ingredients additional to the basic fibre/resin combination may be incorporated to modify the thickness change behaviour. For example control of the dimensional changes in the thickness of the material being moulded may be achieved by introducing a reinforcement additional to the original nominally two-dimensional reinforcement in a plane transverse to the plane of said two-dimensional reinforcement.

Examples of the present invention will now be described by way of example only with reference to the accompanying drawing in which:

FIG. 1 shows diagrammatically a cross-section through a curved moulding.

This invention recognises that any moulding manufactured from a fibre reinforced resinous material will be completely free from cure induced bending distortion and residual bending stresses if the fractional change in thickness of the solid laminate during the cure cycle is exactly equal to the fractional change in in-plane dimensions (assuming that the normal requirements of laminate mid-plane symmetry are met and that no other sources of bending deformation such as thermal gradient during cure are present). This condition can be achieved by tailoring any one of the laminate construction, the resin and reinforcement formulation, cure cycle and the initial cure temperature to produce the required laminate thickness change during cure either by tailoring the initial cure temperature and post cure procedure of a given resin system to produce the desired thickness changes within a particular fibre reinforced laminate or alternatively by tailoring the resin formulation to give the desired laminate thickness changes for a specific desired initial curing temperature and post cure procedure. For a given resin and reinforcement system, the tailoring of the cure cycle can be achieved by varying the initial cure temperature until the sum of the fractional thickness reduction during the initial cure phase and the fractional thickness increase during the post cure phase are equal to the fractional change in laminate in-plane dimensions. Since the latter quantity is usually made as small as possible in highly accurate, stable, high performance mouldings, by the use of stiff relatively thermally inert fibres, the desired condition is usually met when the initial cure thickness shrinkage is approximately equal to the post cure thickness swelling.

It has to be recognised that in certain circumstances it is to be desired that a degree of distortion or in-built stress should be present in the finished moulded article. In such cases the initial cure temperature, or the resin and reinforcement system or the cure cycle or any combination of these are chosen such that the sum of the fractional thickness change during the initial and post cure phases differs from the fractional dimensional change in the plane of the reinforcement by a predetermined amount which results in the desired distortion or in-built stress.

It is normal that during the initial cure phase there is a reduction in the thickness of the article being moulded and in the post cure phase an increase.

This is not always the case, however, and specific combinations of shrinkage and expansion can be built into the resin system by formulation changes. In some cases an expansion of the resin during the initial cure phase is possible.

The present invention has given rise to a moulding method where the desired end condition of the moulded article is independent of the geometry of the article, assuming that any distortion of the article can take place in a stress-free manner, for example the article has only a single curvature.

In the sketch shown in FIG. 1 $\delta\theta$ is the angular change during moulding an arcuate member of circumferential length c, thickness t and arc angle $\theta$. The change in thickness is $\delta t$, that is the sum of the fractional thickness change (usually reduction) during pre-cure and the fractional thickness change (usually increase) during post cure; the change in dimension in the plane of the reinforcement is $\delta c$. Thus:-

$$\frac{\delta\theta}{\theta} = \frac{\frac{\delta C}{C} - \frac{\delta t}{t}}{1 + \frac{\delta t}{t}}$$

EXAMPLE 1

An accurate mould or model of the fibre reinforced resinous item to be manufactured is made. The item may be a component, tool or a mould. Layers of fibre reinforced resinous material are laid against the mould, and a combination of initial cure temperature initial and post cure phases fibre/resin configuration and resin characteristics is selected, such that the sum of the fractional thickness changes in the initial and post cure phases is equal to the sum of the fractional in-plane length changes.

The cured item is free from bending distortion and accurately reproduces the shape of the mould or model at a particular temperature. It is assumed that conventional allowances for linear thermal expansion effects have been made as necessary.

In a specific embodiment of Example 1 a Fothergill and Harvey bi-directional Woven carbon fibre fabric, AO103, is combined with A.C.C. epoxy resin formulation code number LTM 10 (Supplied by Advanced Composite Components Ltd.) to give a laminate with 50% ±5% fibre by volume.

The combination of fibre and resin formulation is laid on a mould whose shape corresponds exactly with the desired shape of the moulded article at the desired end use temperature, in this case, ambient (20° C.). the following cure phases are carried out:

Initial Cure: 3 hours at 60° C.
Post Cure 1: 1 hour at 80° C.
Post Cure 2: 1 hour at 120° C.
Post Cure 3: 1 hour at 150° C.
Post Cure 4: 1 hour at 180° C.

In trials on simple 'channel' section specimens, the above process has been shown to give curing distortion levels over 90% lower than those achievable with conventional materials and processes at a design end-use temperature of 20°±5° C.

For different end-use temperatures, a different set of initial and post cure temperatures is required to meet the high precision moulding condition.

EXAMPLE 2

It is desired to produce an accurate fibre reinforced resinous item, which may be a component or a mould tool. The initial and post cure cycles, fibre/resin configuration and resin characteristics are such that the sum of the fractional thickness changes in the initial and post cure phases differ from the corresponding fractional in-plane length changes by a known amount, at a given temperatures.

The moulding will distort as a result of the curing procedure due to the above. The magnitude and distribution of these distortions and associated residual stresses are predicted using structural analysis techniques in conjunction with the distortion equation:

$$\frac{\delta\theta}{\theta} = \frac{\frac{\delta C}{C} - \frac{\delta t}{t}}{1 + \frac{\delta t}{t}}$$

The predicted distortions are used to determine the required shape of the mould tool or model, against which the fibre reinforced resinous material is to be moulded, in order to produce a fibre reinforced item of a particular desired shape at a given temperature.

EXAMPLE 3

It is desired to produce an accurate fibre reinforced resinous item. The initial and post cure cycles, fibre/resin configuration and resin characteristics are such that the sum of the fractional thickness changes in the initial and post cure phases differ from the corresponding fractional in-plane length changes by a known amount at a given use temperature referred to as "T1".

The item will distort as a result of the curing procedure due to the above.

Firstly an accurate model or pattern of the item is made (which may or may not include allowances for thermal expansion).

Secondly a fibre resin system is selected, different from that comprising the item, and having characteristics such that the sum of the fractional thickness changes in the initial and post cure phases differ from the corresponding fractional in-plane length changes by an amount which is equal and opposite to that of the material comprising the item at temperature T1, at the initial cure temperature of that item, referred to as T2. This second fibre reinforced resinous material is laid against the model or pattern, and cured to form a mould tool. This mould tool will be distorted from the shape of the model.

Layers of the first fibre reinforced resinous material are laid against the distorted mould tool and cured to form the item. The item will distort during cure in a manner which gives equal and opposite distortions to those induced in the mould tool. The final shape of the item will thus be the same as that of the model, notwithstanding any normal thermal expansion allowances which may be made in the size of the model.

For many shapes of item, the construction of the mould tool my differ significantly from that of the item. For other shapes of item the construction of the mould tool may be similar to that of the item.

EXAMPLE 4

This example is similar to Example 3, except that additional fibre reinforced mouldings may be used to progress from an accurate model to a final desired shape.

Any, none or all of the fibre reinforced resinous mouldings may distort as a result of the curing procedure.

The distortion of any, none or all of the fibre reinforced resinous mouldings may be deliberately engineered, by controlling one or a combination of fibre/resin system, resin cure characteristics, initial cure temperature, post curing procedure.

Any, or none of the moulding stages may be carried out with or without fibre reinforced resinous material.

The sum of all distortions incurred with each intermediate moulding stage combine to compensate for the distortion which occurs in the final moulding stage.

For some mouldings, particularly those using unidirectional fibres as reinforcement, the in-plane dimensional changes can vary with direction. In such cases, the curing process can be tailored to produce a fractional thickness change which equals the in-plane dimensional change in one direction only, or with matches a mean value of the in-plane dimensional change, as desired. For the majority of practical laminate configurations however, the in-plane dimensional changes in any direction are small compared to the corresponding thickness changes and therefore the directional variation of in-plane dimensional changes does not usually constitute a major source of dimensional inaccuracy.

Since all complex mouldings require some form of pattern, master model or mould to produce the required shape during the initial cure, and since the pattern itself will be affected by thermal expansion phenomena, it is highly desirable for the initial cure temperature to be as low as possible for the case where the highest accuracy is required at ambient temperatures. This can be achieved by tailoring the resin formulation itself to give the desired shrinkage/swelling behaviour for a specific initial cure temperature, which will preferably be at ambient temperature, or as close to it as other factors will allow. For cases where the highest accuracy is required at other than ambient temperatures, the preferred initial cure temperature will usually depend on the varying requirements of (a) minimisation of inaccuracies due to differential thermal expansion of the pattern and moulding, and (b) the ability of the pattern materials to withstand the temperatures at which the initial cure is carried out.

Although there exist other sources of distortion and residual stress in the production of fibre reinforced mouldings, such as temperature gradients through the thickness of the laminate during cure and misalignment of fibres, the method proposed herein eliminates a major source of cure distortion and greatly improves the levels of accuracy achievable, compared to existing production methods.

Although the examples given herein relate specifically to the use of thermosetting resins in conjunction with two dimensional carbon fibre reinforcement, the method is potentially applicable to any other two dimensional fibre and matrix combination, although the magnitude and sign of the dimensional changes may differ. Providing the net fractional through thickness and in-plane dimensional changes can be controlled independently, and thereby be made equal, the high precision moulding condition can be achieved.

An alternative method of achieving the high precision moulding condition is to introduce through thickness fibre reinforcement into a nominally two dimensionally fibre reinforced laminate, thereby providing a further means of controlling the through-thickness expansional or shrinkage behaviour.

For components which have a sandwich form of construction, i.e. with fibre reinforced laminated face skins on a low density core material, the through thickness expansional/contractional strains due to the curing and bonding procedures will in general be different in the differing materials. In such cases the combined effect of changes in facing skin thickness and changes in core thickness must be considered in defining the curing and bonding processes necessary to achieve the high precision moulding condition.

In the vast majority of practical sandwich constructions, however, where the facing skins are thin compared with the core thickness, the effect of internally generated bending stresses within the thin, flexible facing skins will have negligible effect on the bending behaviour of the sandwich panel as a whole. Similarly the in-plane expansional/contractional behaviour of the low density, low stiffness core will have little effect on the in-plane expansional/contractional behaviour of the stiff (membrane-like) facing skins. Thus for this very common form of construction, the high precision moulding condition will be met, to a very good approximation, when the fractional thickness change in the core material during the curing and bonding processes is equal to the corresponding, fractional change in in-plane dimensions of the facing skins, these quantities being measured from the point at which the skins and core become solid and mutually attached, until the conclusion of the curing and bonding processes.

It is anticipated that if elevated temperatures are used in the curing and bonding processes, the use of special core materials, such as carbon fibre reinforced honeycomb, may be necessary to achieve the high precision moulding condition.

Whereas the above Specification relates specifically to fibre reinforced resinous material, the method is applicable to all types of fibre reinforced composite materials including those will non-resinous matrices such as metals, alloys, ceramics or thermoplastics. Any type of reinforcing fibre may be used.

The mouldings produced by the process may be used as moulds, structural components, jigs and fixtures, or any other use in which such materials are preferred. Many different applications exist in the aerospace, defence, and high precision industries. Specific examples are satelite, spacecraft and aircraft components, and radar and communications reflectors, wave-guides, and structures.

It is emphasised that in the foregoing description and in the following claims it has to be realised that those distortions normally to be expected, for example due to thermal changes during curing are accounted for, as normal, during mould design or during the selection of initial cure temperature, resin system composition and initial and post cure phases.

We claim:

1. In a method of molding a fiber reinforced resinous material including the step of providing a fibrous reinforcement in an initially uncured resin matrix wherein a range of values is known for two out of three variables representing (1) the initially uncured resin matrix; (2) the initial and post-cure phases; and (3) the initial cure temperature, the improvement which comprises the steps of:

(a) pre-selecting a value from the known range of values for each of the two known variables;

(b) determining a value for the third variable which results in the sum of the fractional thickness change during the initial cure phase and the fractional thickness change during the post-cure phase being equal to or differing by a predetermined amount from the fractional dimensional change in the plane of the fiber reinforcement at the desired end use temperature at which greatest dimensional accuracy is required; and (c) curing the matrix in accordance with the valves determined in sub-paragraphs (a)-(b).

2. A method as claimed in claim 1, in which where a multi-layer, multi-orientation, unidirectional fibre reinforcement is employed a curing process is selected which will produce a fractional thickness change which equals the dimensional change in the plane of the reinforcement in one particular direction of fibre orientation, or which matches the mean value of the in-plane dimensional change.

3. A method as claimed in claim 1, in which the resinous material is moulded on a mould which corresponds exactly to the shape of the article being moulded at the desired end-use temperature whereby the moulded article at said desired temperature on removal from the mould conforms exactly to said mould shape when the sum of the fractional thickness changes during cure equals the fractional dimensional change in the plane of the fibre reinforcement or is distorted from said mould shape or conforms to the mould shape and includes residual stresses or a combination of distortion and residual stresses on removal from the mould when the sum of the fraction thickness changes during cure differs from the fractional dimensional change in the plane of the fibre reinforcement.

4. A method as claimed in claim 1, in which the resinous material is moulded on a mould whose shape differs from the shape of the final shape of the article to be moulded at the desired end-use temperature by a predetermined amount whereby the moulded article on removal from the mould conforms exactly to the desired shape when the sum of the fractional thickness changes during cure differs from the fractional dimensional change in the plane of the fibre reinforcement by a predetermined amount chosen to achieve this condition.

5. A method as claimed in claim 1, in which ingredients additional to the basic fibre/resin combination are incorporated to modify the thickness change behaviour.

6. A method as claimed in claim 5, in which an additional reinforcement is arranged substantially transversely of the fibrous reinforcement.

7. In a method of molding an article from an initially uncured fiber reinforced resinous material including the steps of providing a mold on which to form the molded article and laying in the mold a fiber reinforced resinous material having fibrous reinforcement in an initially uncured resin matrix, the improvement which comprises the steps of:

(a) initiating a cycle which will result in the curing of the matrix;

(b) including in said cycle an initial cure phase and a post cure phase;

(c) for a given resin system and cure phases, commencing the initial cure at a temperature which will result in the sum of the fractional thickness change during the initial cure phase and the fractional thickness change during the post cure phase being equal to the fractional dimensional change in the plane of the fiber reinforcement at the desired end use temperature at which the greatest dimensional accuracy is required, and (d) completing the curing cycle according to step (c).

8. A method as claimed in claim 7, characterised in that the initial cure temperature is ambient.

9. In a method of molding an article from an initially uncured fiber reinforced resinous material which includes the steps of providing a mold on which to form the molded article and laying in the mold a fiber reinforced resinous material having a fibrous reinforcement in an initially uncured resin matrix, the improvement comprising:

(a) initiating a cycle which will result in the curing of the matrix;

(b) including in said cycle an initial cure phase and a post cure phase;

(c) for a given resin system and cure phases, commencing the initial cure at a temperature which will result in the sum of the fractional thickness change during the initial cure phase and the fractional thickness change during the post cure phase differing by a predetermined amount from the fractional dimensional change in the plane of the fiber reinforcement at the desired end use temperature at which greatest dimensional accuracy is required; and (d) completing the curing cycle according to step (c).

10. In a method of molding an article from an initially uncured fiber reinforced resinous material including the steps of providing a mold on which to form the molded article and laying in the mold a fiber reinforced resinous material having fibrous reinforcement in an initially uncured resin matrix, the improvement comprising:

(a) initiating a cycle which will result in the curing of the matrix;

(b) including in said cycle an initial cure phase and a post cure phase;

(c) for a given initial temperature and cure phases, preselecting a resin system which will result in the sum of the fractional thickness change during the initial cure phase and the fractional thickness change during the post cure phase being equal to the fractional dimensional change in the plane of the fiber reinforcement at the desired end use temperature at which the greatest dimensional accuracy is required, and (d) completing the curing cycle according to step (c).

11. In a method of molding an article from an initially uncured fiber reinforced resinous material including the steps of providing a mold on which to form the molded article and laying in the mold a fiber reinforced resinous material having fibrous reinforcement in an initially uncured resin matrix, the improvement comprising:

(a) initiating a cycle which will result in the curing of the matrix;

(b) including in said cycle an initial cure phase and a post cure phase;

(c) for a given initial temperature and cure phases, preselecting a resin system which will result in the sum of the fractional thickness change during the initial cure phase and the fractional thickness change during the post cure phase differing by a predetermined amount from the fractional dimensional change in the plane of the fiber reinforcement at the desired end use temperature at which greatest dimensional accuracy is required, and (d) completing the curing cycle according to step (c).

12. In a method of molding an article from an initially uncured fiber reinforced resinous material including the steps of providing a mold on which to form the molded article and laying in the mold a fiber reinforced resinous material having fibrous reinforcement in an initially uncured resin matrix, the improvement comprising:

(a) initiating a cycle which will result in the curing of the matrix;

(b) including in said cycle an initial cure phase and a post cure phase;

(c) for a given initial temperature and resin system preselecting cure phases which will result in the sum of the fractional thickness change during the initial cure phase and the fractional thickness change during the post cure phase being equal to the fractional dimensional change in the plane of the fiber reinforcement at the desired end use temperature at which the greatest dimensional accuracy is required; and (d) completing the curing cycle according to step (c).

13. In a method of molding an article from an initially uncured fiber reinforced resinous material including the steps of providing a mold on which to form the molded article and laying in the mold a fiber reinforced resinous material having fibrous reinforcement in an initially uncured resin matrix, the improvement comprising:

(a) initiating a cycle which will result in the curing of the matrix;

(b) including in said cycle an initial cure phase and a post cure phase;

(c) for a given initial temperature and resin system preselecting cure phases which will result in the sum of the fractional thickness change during the initial cure phase and the fractional thickness change during the post cure phase differing by a predetermined amount from the fractional dimensional change in the plane of the fiber reinforcement at the desired end use temperature at which greatest dimensional accuracy is required; and (d) completing the curing cycle according to step (c).

* * * * *